United States Patent Office
3,075,939
Patented Jan. 29, 1963

3,075,939
METHOD OF PREPARING DISPERSIONS FROM BLEND OF FLUORINE CONTAINING POLYMERS
William H. Bauer, Jr., Pittsburgh, Pa., and Jay A. Gervasi, St. Albans, W. Va., assignors to Minnesota Mining and Manufacturing Company, St. Paul, Minn., a corporation of Delaware
No Drawing. Filed Oct. 8, 1958, Ser. No. 765,948
8 Claims. (Cl. 260—30.4)

This invention relates to blending of fluorine-containing high molecular weight polymers. In one aspect this invention relates to blending and coagulation of a polyhalocarbon latex. In another aspect this invention relates to a new and improved blend of high molecular weight fluorine-containing polymers. In still another aspect this invention relates to a dispersion of a fluorine-containing high molecular weight polymer. A further aspect relates to a new and improved heat and chemical resistant lacquer.

In the application of lacquer formulations to surfaces, it is known that benefits can be obtained by incorporating fillers in the lacquer. The filler increases the solids content which, in spraying applications, produces a thicker film per coat. It also has been found that spray characteristics are improved, e.g., webbing is reduced due to the decrease in viscosity. The inert filler also promotes more even solvent release from the coating.

If the lacquer formulations are to impart to the coating impermeability to moisture and solvents, inertness to chemical reaction and stability to heat, the use of fluorine-containing high molecular weight polymers in the formulations is desirable. Still it is necessary to incorporate an inert filler into the lacquer for the reasons above mentioned. Ordinary fillers are not sufficiently inert for use with these new polyhalocarbon base lacquers. However, in accordance with this invention, novel suspensions of inert insoluble halocarbon polymer fillers which are chemically inert and resistant to moisture and solvent attack and which are of the desired particle size are prepared by a new and improved method.

It is important that the particle size of the inert fillers be as small as possible, i.e., below one micron. By ordinary milling techniques for reducing particle size, it is not possible to obtain efficiently a particle size small enough to use in the dispersions of this invention. If the particles are too large, they tend to settle out of the solution in which they are dispersed and also to produce a permeable coating.

It is an object of this invention to provide a method for incorporating fluorine-containing high molecular weight polymer fillers into lacquer formulations.

It is another object of this invention to provide a method for producing dispersions of fluorine-containing high molecular weight polymers in which the insoluble polymer is of a small particle size.

It is still another object of this invention to provide a dispersed phase of finely divided fluorine-containing high molecular weight resin in a soluble fluorine-containing high molecular weight solute phase and a method for the preparation thereof.

It is a further object of this invention to provide a formulation in which a finely divided insoluble polyhalocarbon polymer is dispersed in a solvent containing soluble polyhalocarbon polymer.

Various other objects and advantages will become apparent to those skilled in the art on reading the accompanying description and disclosure.

In general, the above objects are accomplished by blending an aqueous latex of a soluble normally solid fluorine-containing high molecular weight polymer with a latex of an insoluble normally solid fluorine-containing high molecular weight polymer, coagulating the resulting blended latices, and adding the coagulum to a suitable solvent for the soluble polymer, thereby obtaining an improved fine dispersion of the insoluble polymer in a solvent containing the soluble polymer as solute.

Various combinations of particular soluble and insoluble normally solid fluorine-containing high molecular weight polymers may be used within the scope of this invention. Among the soluble polymers of this invention are: trifluorochloroethylene-vinylidene fluoride elastomer (20–69 mol percent of trifluorochloroethylene), trifluorochloroethylene-vinylidene fluoride resin (70–80 mol percent trifluorochloroethylene), 1-chloro-1-fluoroethylene-tetrafluoroethylene copolymer (between 20 and 80 mol percent, preferably about 50 mol percent, of tetrafluoroethylene), polytrifluoroethylene, polyvinylidene chloride, perfluoropropene-vinylidene fluoride copolymer (15–50 mol percent perfluoropropene), polyvinyl chloride, etc. The soluble polymers of this invention generally have molecular weights not lower than about 20,000 and usually above 50,000. Among the insoluble polymers of this invention are: polyvinylidene fluoride, trifluorochloroethylene homopolymer, tetrafluoroethylene homopolymer, trifluorochloroethylene-vinylidene fluoride (above 90 and less than 100 mol percent of trifluorochloroethylene), etc. The insoluble polymers of this invention generally have molecular weights above 50,000.

In a preferred embodiment of this invention, the soluble, normally solid fluorine-containing high molecular weight polymer is trifluorochloroethylene-vinylidene fluoride copolymer (20–69 mol percent of trifluorochloroethylene) and the insoluble, normally solid fluorine-containing high molecular weight polymer is high molecular weight trifluorochloroethylene homopolymer, trifluorochloroethylene-vinylidene fluoride copolymer (above 90 and less than 100 mol percent of trifluorochloroethylene), perfluoropropene-vinylidene fluoride copolymer (1–6 mol percent of perfluoropropene), or any mixture thereof. A particularly preferred combination of soluble/insoluble polymer is trifluorochloroethylene-vinylidene fluoride copolymer (25 mol percent vinylidene fluoride)/trifluorochloroethylene-vinylidene fluoride copolymer (4 mol percent vinylidene fluoride).

The fine dispersions of this invention are perpared by blending at least one latex of an insoluble, normally solid halocarbon polymer with at least one latex of a solube, normally solid halocarbon polymer in a ratio based on solids. The weight ratio of soluble polymer to insoluble or inert polymer can vary from 2:1 to 100:1. The particular ratio selected for a particular dispersion depends on the characteristics of the polymers in solution, or the type of film desired, and the particular application. A 4:1 ratio of soluble to insoluble polymer gave particularly good results in a trifluorochloroethylene-vinylidene fluoride copolymer (25 mol percent vinylidene fluoride)/trifluorochloroethylene-vinylidene fluoride copolymer (4 mol percent vinylidene fluoride) system. As used herein, the term "soluble" and "insoluble" refer to the relative solubilities of the polymers in the given solvent system used in accordance with this invention.

After blending the respective latices, the polymers are coagulated, preferably by sudden freezing in liquid nitrogen or air, the coagulant forming in a finely divided state. Any method may be used to coagulate the blended latices as long as the required particle size, e.g., usually below one micron, is obtained. Coagulation by addition of an electrolyte, such as a NH$_4$Cl—HCl solution, for example, has been found to be satisfactory. The coagulum is preferably washed with water to remove inorganic constituents and then with methanol to remove water and organic matter other than the halocarbon polymers, after which the coagulum is dried.

The dried coagulum or polymer blend is then treated with a solvent which dissolves the soluble fluorine-containing polymer, resulting in a finely divided suspension of the insoluble fluorine-containing polymer in a solvent which contains the soluble polymer as a solute. When used in lacquer compositions, this suspension may be formulated into a complete lacquer in various ways, such as later described. Depending on the nature of the polymers and the desired physical characteristics of the lacquer formulation, such as drying time, etc., any of the solvents for the soluble halocarbon polymer may be used, e.g., aliphatic ketones such as acetone, diethyl ketone, methyl ethyl ketone, methyl propyl ketone, methyl isopropyl ketone, methyl butyl ketone, methyl isobutyl ketone, methyl amyl ketone, diisobutyl ketone, methyl isoamyl ketone, ethyl propyl ketone; aliphatic esters such as ethylene glycol diacetate, ethyl acetate, propyl acetate, butyl acetate, amyl acetate; cyclic ethers such as tetrahydrofuran and dioxane; ether alcohols such as dimethyl ether of ethylene glycol; and other solvents in which the soluble fluorine-containing polymers are selectively more soluble than the insoluble fluorine-containing polymers. Generally the higher molecular weight solvents have a correspondingly slower drying rate and therefore a mixture of such solvents may be used to control the drying rate. The weight ratio of solvent to soluble polymer is preferably between about 4:1 and about 100:1.

It is also within the scope of this invention to incorporate thinners, such as benzene, toluene, xylene, other aromatics and hydrocarbons, into the dispersion or blend to regulate the viscosity and the solids concentration, depending on the ultimate use of such dispersions. Similarly, various additives may also be included, such as organic and inorganic pigments, dyes, etc.

Suspensions or blends produced in accordance with this invention have the advantage of being able to contain larger amounts of suspended insoluble fluorine-containing polymer than could be obtained without the use of the soluble polymer. For use in a lacquer composition, these suspensions are particularly desirable because of the higher solids or polymer content which is obtained, thereby producing a thicker film per coat in spray application to surfaces. Because of the compatibility of these soluble and insoluble fluorine-containing polymers, the soluble polymers such as trifluorochloroethylene-vinylidene fluoride elastomer (20-69 mol percent trifluorochloroethylene) tend to exert a plasticizing effect on the insoluble polymer and thus produce coatings of greater flexibility, enhanced chemical resistance, and better resistance to thermal degradation without any effect on high temperatures and chemical resistant properties of the film. By using the latices blending technique of this invention, the particle size of the suspended insoluble fluorine-containing polymer is efficiently reduced, producing thereby a more stable suspension and a less permeable surface coating or protective film than was heretofore obtainable. When these suspensions are used in lacquer compositions, they are applied by conventional techniques, such as spraying, dip coating, etc., to a variety of surfaces, for example, sheet material, curved surfaces, textured surfaces, polished surfaces, etc., and to a variety of materials, such as metal, glass, synthetic and natural textile fibers and fabrics, plastics, etc.

In order to illustrate the process of this invention, the following examples are presented below. These examples are offered for purposes of illustration and are not to be construed as necessarily limiting. As indicated previously, the admixing technique involves the blending of polymer latices. Examples I and II illustrate the preparation of polymer in an emulsion system to produce a polymer latex.

EXAMPLE I

This example illustrates the preparation of a copolymeric latex in which the copolymer is an insoluble copolymer of trifluorochloroethylene and vinylidene fluoride (96 to 4 mol percent, respectively). In preparing the copolymer, the following recipe was charged to a horizontal stainless steel autoclave with stirring.

*Table I*

|  | Grams |
|---|---|
| Water | 54,500 |
| $Cl(CF_2CFCl)_3CF_2COOH$ | 816 |
| KOH | 118 |
| $K_2S_2O_8$ | 439 |
| $K_2HPO_4$ | 570 |
| Trifluorochloroethylene | 18,143 |
| Vinylidene fluoride | 360 |

The aqueous recipe was adjusted to a pH of about 8. The copolymerization was carried out at a temperature of about 95° F. and a pressure of 189 pounds per square inch for approximately 4.2 hours. The conversion was 72 percent of the total monomer charge. The copolymer contained 3.6 mol percent of vinylidene fluoride as analyzed by infra-red and had a Z.S.T. of 335 and a $Tm$ °C. of 201.5.

EXAMPLE II

This example illustrates the preparation of a copolymer latex in which the copolymer is a soluble copolymer of trifluorochloroethylene and vinylidene fluoride in approximately a 50/50 mol ratio. In preparing this elastomeric copolymer latex, the following ingredients were charged to a stainless steel autoclave with stirring.

*Table II*

|  | Grams |
|---|---|
| Trifluorochloroethylene/vinylidene fluoride (45.3 mol percent and 54.7 percent respectively) | 2,330 |
| Water | 7,000 |
| $K_2S_2O_8$ | 70 |
| $Cl(CF_2CFCl)_3CF_2COOH$ | 35 |
| $Na_2HPO_4.7H_2O$ | 140 |

The two monomers were admixed (approximately 12 pounds of trifluorochloroethylene and 8 pounds of vinylidene fluoride) prior to charging the reactor. The polymerization was carried out at a temperature of 95° F. and a pressure of 185 pounds per square inch for a polymerization time of 5 hours and 35 minutes.

The mol ratio of the comonomers in the copolymeric plasticizer can be changed by varying the mol ratios of the monomer charge in the above recipe. For example, a copolymer of trifluorochloroethylene and vinylidene fluoride (75/25 mol percent) was prepared by charging a monomer admixture containing about 18 mol percent of vinylidene fluoride and about 82 mol percent of trifluorochloroethylene to the above recipe.

EXAMPLE III 115 grams of trifluorochloroethylene-vinylidene fluoride insoluble copolymer (96:4 mol ratio) latex containing 21.7% solids by weight was blended with 222 grams of trifluorochloroethylene-vinylidene fluoride soluble copolymer (75:25 mol ratio) latex containing 45.0% solids by weight to produce a polyblend of approximately 4:1 by weight of soluble-insoluble polymer. The blended latex was coagulated by immersion in liquid nitrogen. The mixed polymer coagulum was washed by reslurrying in boiling water (3 times) to remove inorganic salts introduced in the polymerization recipe, and then washed with cold methanol (3 times). After drying, a lacquer formulation of the following composition was prepared:

| | Percent by weight |
|---|---|
| Soluble polyhalocarbon polymer | 18.4 |
| Insoluble polyhalocarbon polymer | 4.6 |
| Methyl isobutyl ketone | 35.7 |
| Ethyl butyl ketone | 3.7 |
| Ethyl amyl ketone | 3.7 |
| Toluene | 33.9 |
| | 100.0 |

92.0 grams of the polyblend was mixed with 142.8 grams of methyl isobutyl ketone and rotated overnight in an elbow blender. After this treatment the soluble polymer had completely dissolved and the insoluble polymer had dispersed. No visual evidence of settling of the insoluble particles was detected after standing for 20 days. 14.8 grams of ethyl butyl ketone and 14.8 grams of ethyl amyl ketone were then added. 139.6 grams of toluene was weighed out and added in small amounts. After approximately two-thirds of the toluene was added, the lacquer became clear. As the remainder of the toluene was added a faint blue opalescence developed. No solid particles were apparent in the final lacquer, although a Tyndall effect could be noticed. Viscosity comparison of this lacquer with a lacquer formulation containing only the soluble polymer (16.2 weight percent) showed it to be less viscous even though the solids or total polymer content was higher in the lacquer containing insoluble polymer.

The above prepared lacquer was sprayed over a steel surface to obtain a continuous film of soluble polymer containing the insoluble polymer as inert filler. To produce a 10 mil film using a lacquer with only a soluble polyhalocarbon resin (16.2 weight percent) required about 40 passes. Using the lacquer prepared in the above example, a 10 mil film was produced in about 25 passes for cold spraying. When spraying at elevated temperatures, such as 160° F., the above effect is even more pronounced.

As indicated previously, the fine dispersions of this invention are produced by blending a latex of a soluble halocarbon polymer with a latex of an insoluble halocarbon polymer, coagulating the blended latices, washing and drying the coagulum, and adding the coagulum to a suitable solvent for the soluble halocarbon polymer, thus obtaining a fine dispersion of the insoluble halocarbon polymer in a solvent containing a soluble halocarbon polymer as solute.

Various alterations and modifications of the invention and its aspects may become apparent to those skilled in the art without departing from the scope of this invention. Thus, for example, other fluorine-containing soluble and insoluble polymers may be employed, as well as other solvents for the soluble polymer. More than one soluble and/or insoluble polymer in the composition of this invention is also anticipated.

We claim:
1. The method of making a fine dispersion which comprises blending a latex of a soluble, normally solid fluorine-containing copolymer of vinylidene fluoride and a member of the group consisting of perfluoropropene and trifluorochloroethylene with a latex of an insoluble, normally solid trifluorochloroethylene polymer, the ratio of soluble to insoluble polymer in the resulting blended latex ranging from 2:1 to 100:1, coagulating the latex blend to produce a coagulum, adding the coagulum to a solvent for the soluble normally solid fluorine-containing copolymer and agitating the resulting admixture, thereby obtaining a fine dispersion of the insoluble, normally solid trifluorochloroethylene polymer in a solvent containing the soluble, normally solid fluorine-containing copolymer as a solute.

2. The method of claim 1 in which the solvent comprises a member of the group consisting of esters, ketones, ether alcohols, and cyclic ethers.

3. The method of claim 1 in which the fluorine-containing polymer is, in each instance, a polymer of trifluorochloroethylene.

4. The method of claim 1 in which the soluble, normally solid fluorine-containing polymer is a copolymer of perfluoropropene and vinylidene fluoride.

5. The method of claim 1 in which the insoluble, normally solid polymer of trifluorochloroethylene is a trifluorochloroethylene homopolymer and the soluble, normally solid polymer of trifluorochloroethylene is a copolymer of trifluorochloroethylene and vinylidene fluoride having between about 20 and about 69 mol percent of trifluorochloroethylene.

6. The method of claim 1 in which the insoluble, normally solid polymer of trifluorochloroethylene is a copolymer of trifluorochloroethylene and vinylidene fluoride having between about 90 and 100 mol percent of trifluorochloroethylene and the soluble, normally solid polymer of trifluorochloroethylene is a copolymer of trifluorochloroethylene and vinylidene fluoride having between about 20 and about 69 mol percent of trifluorochloroethylene.

7. The method of claim 1 in which the latex blend is coagulated by freezing.

8. The method of claim 1 in which the latex blend is coagulated by addition of an electrolyte.

References Cited in the file of this patent
UNITED STATES PATENTS

| 2,732,357 | Sprung | Jan. 24, 1956 |
|---|---|---|
| 2,766,215 | Stoops et al. | Oct. 9, 1956 |
| 2,775,569 | Dipner et al. | Dec. 25, 1956 |
| 2,789,960 | Smith | Apr. 23, 1957 |
| 2,793,202 | Hoyt | May 21, 1957 |
| 2,866,721 | Hetherington | Dec. 30, 1958 |
| 2,866,769 | Happoldt | Dec. 30, 1958 |
| 2,880,185 | Lee | Mar. 31, 1959 |